US009526216B2

United States Patent
Caldeira et al.

(10) Patent No.: US 9,526,216 B2
(45) Date of Patent: Dec. 27, 2016

(54) SYSTEM FOR FACILITATING CLOUD FORMATION AND CLOUD PRECIPITATION

(71) Applicant: Elwha LLC, Bellevue, WA (US)

(72) Inventors: Kenneth G. Caldeira, Redwood City, CA (US); Alistair K. Chan, Bainbridge Island, WA (US); Roderick A. Hyde, Redmond, WA (US); Jordin T. Kare, Seattle, WA (US); Nathan P. Myhrvold, Medina, WA (US); Charles Whitmer, North Bend, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 906 days.

(21) Appl. No.: 13/685,347

(22) Filed: Nov. 26, 2012

(65) Prior Publication Data

US 2014/0145002 A1    May 29, 2014

(51) Int. Cl.
| | | |
|---|---|---|
| *A01G 15/00* | (2006.01) | |
| *H05F 7/00* | (2006.01) | |
| *G01S 17/95* | (2006.01) | |
| *B64D 1/16* | (2006.01) | |
| *B64D 1/18* | (2006.01) | |

(52) U.S. Cl.
CPC ............... *A01G 15/00* (2013.01); *B64D 1/16* (2013.01); *B64D 1/18* (2013.01); *G01S 17/95* (2013.01); *H05F 7/00* (2013.01); *Y10T 137/1987* (2015.04)

(58) Field of Classification Search
CPC ..... A01G 15/00; Y10T 137/1987; B64D 1/16; B64D 1/18; H05F 7/00; G01S 17/95
USPC . 239/2.1, 14.1, 171, 289; 361/231; 244/136; 137/79, 80; 356/5.01
See application file for complete search history.

(56) References Cited

U.S. PATENT DOCUMENTS

| | | | | |
|---|---|---|---|---|
| 1,928,963 A | | 10/1933 | Chaffee | |
| 3,019,989 A | * | 2/1962 | Vonnegut | A01G 15/00 239/14.1 |
| 3,284,686 A | * | 11/1966 | Moses | H05F 7/00 361/231 |
| 3,600,653 A | | 8/1971 | Hall | |
| (Continued) | | | | |

FOREIGN PATENT DOCUMENTS

| | | |
|---|---|---|
| JP | 09233957 A | 9/1997 |
| JP | 2007104904 A | 4/2007 |
| (Continued) | | |

OTHER PUBLICATIONS

Kirkby, J., Cloud: A Particle Beam Facility to Investigate the Influence of Cosmic Rays on Clouds, CERN-EP/2002-019, European Organization for Nuclear Research, Feb. 26, 2002, 78 pages.

(Continued)

*Primary Examiner* — Steven J Ganey
(74) *Attorney, Agent, or Firm* — Foley & Lardner LLP

(57) ABSTRACT

A system for facilitating cloud formation and cloud precipitation includes a controller and a beam emitter that is responsive to the controller. The beam emitter is configured to emit a beam to form charged particles within an atmospheric zone containing water vapor. The charged particles enhance the formation of cloud condensation nuclei such that water vapor condenses on the cloud condensation nuclei forming cloud droplets. The system further includes a sensor configured to detect a cloud status and output a signal corresponding to the cloud status to the controller.

44 Claims, 8 Drawing Sheets

(56) References Cited

U.S. PATENT DOCUMENTS

| | | | |
|---|---|---|---|
| 4,402,480 A | 9/1983 | Udell | |
| 4,671,805 A | 6/1987 | Gourdine | |
| 4,685,620 A | 8/1987 | Law et al. | |
| 6,281,969 B1 * | 8/2001 | Gelbwachs | G01S 17/95 356/5.01 |
| 2004/0134997 A1 | 7/2004 | Khain et al. | |
| 2007/0238252 A1 | 10/2007 | Eastlund | |
| 2008/0283386 A1 | 11/2008 | Kaufman | |

FOREIGN PATENT DOCUMENTS

| | | |
|---|---|---|
| KR | 20030039855 A | 5/2003 |
| WO | WO 98/07016 | 2/1998 |
| WO | WO 03/061370 A1 | 7/2003 |
| WO | WO 2008/062441 A2 | 5/2008 |

OTHER PUBLICATIONS

Kirkby, J., Cosmic Rays and Climate, CERN-PH-EP/2008-005, European Organization for Nuclear Research, Mar. 26, 2008, 44 pages.

PCT International Search Report; International App. No. PCT/US2013/071684; Mar. 26, 2014; pp. 1-3.

* cited by examiner

```
┌─────────────────────────────┐
│ 801 ─┐                      │
│  ┌──────────────────────────┐
│  │ Locate target atmospheric area │
│  └──────────────────────────┘
│            │
│ 802 ─┐     ▼
│  ┌──────────────────────────┐
│  │   Target atmospheric area │
│  └──────────────────────────┘
│            │
│ 803 ─┐     ▼
│  ┌──────────────────────────┐
│  │   Deposit charged particles │
│  └──────────────────────────┘
│            │
│ 804 ─┐     ▼
│  ┌──────────────────────────┐
│  │      Sense cloud status   │
│  └──────────────────────────┘
│            │
│ 805 ─┐     ▼
│  ┌──────────────────────────┐
│  │ Stop depositing charged particles │
│  └──────────────────────────┘
```

SYSTEM FOR FACILITATING CLOUD FORMATION AND CLOUD PRECIPITATION

BACKGROUND

It is desirable to control cloud formation and precipitation. Controlling cloud coverage by creating clouds or precipitating clouds provides some measure of control over warming, cooling, and climate benefits such as atmosphere albedo factors. Controlling precipitation has certain advantages, including helping farmlands to receive enough water to maximize crop output, aiding in the accumulation of natural snow on ski slopes, and helping to prevent precipitation when outdoor activities are scheduled.

Cloud formation requires both atmospheric water vapor and cloud condensation nuclei (CCN). Water vapor contained in the atmosphere condenses on the CCN when the atmosphere contains both the right amount of water and the right amount of nuclei. When water vapor condenses on the CCN in mass quantities, clouds form. When the particles of condensed water reach a critical weight, the condensed water droplets fall as precipitation.

SUMMARY

One exemplary embodiment relates to a ground-based system for facilitating cloud formation and cloud precipitation includes a controller and a beam emitter that is responsive to the controller. The beam emitter is configured to emit a beam to form charged particles within an atmospheric zone containing water vapor. The charged particles enhance the formation of cloud condensation nuclei such that water vapor condenses on the cloud condensation nuclei forming cloud droplets. The system further includes a sensor configured to detect a cloud status and output a signal corresponding to the cloud status to the controller.

Another exemplary embodiment relates to an air-based system for facilitating cloud formation and cloud precipitation. The system includes a flying device and a charging device configured to form charged particles in an atmosphere containing water vapor. The charged particles enhance the formation of cloud condensation nuclei such that the water vapor condenses on the cloud condensation nuclei forming cloud droplets. The system further includes a sensor configured to detect a cloud status and output a signal corresponding to the cloud status.

Yet another exemplary embodiment relates a method of cloud formation. The method includes locating an atmospheric area of water vapor. The atmospheric area of water vapor has an altitude. The method further includes targeting the atmospheric area of water vapor. The method includes forming charged particles within the atmospheric area of water vapor such that the charged particles enhance formation of cloud condensation nuclei. The water vapor contained within the atmospheric area of water vapor condenses on the cloud condensation nuclei forming cloud droplets that form a cloud. The method further includes sensing a cloud status.

An additional exemplary embodiment relates a method of facilitating cloud precipitation. The method includes targeting a cloud comprising cloud droplets. The method further includes providing a charge forming device. The method includes sensing a cloud status and forming charged particles within the cloud. The charged particles facilitate an expansion in size of the cloud droplets.

Still another exemplary embodiment relates to a method facilitating cloud control for a customer. The method includes receiving a cloud related request from the customer. The request provides a target area of land. The method includes analyzing the request. The method further includes providing a charge forming device and forming charged particles within a target zone of an atmosphere. The method includes sensing a cloud status. The method further includes receiving payment from the customer.

Another exemplary embodiment relates to a method of renting cloud control equipment to a customer. The method includes receiving a rental request from the customer. The request includes a rental time length. The method further includes providing the customer a charge forming cloud control device and charging the customer a rental fee. The method includes receiving payment from the customer.

The invention is capable of other embodiments and of being carried out in various ways. Alternative exemplary embodiments relate to other features and combinations of features as may be generally recited in the claims.

The foregoing is a summary and thus by necessity contains simplifications, generalizations, and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE FIGURES

FIG. 8 is a flow diagram for a method of cloud formation and cloud precipitation.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Figure 1:
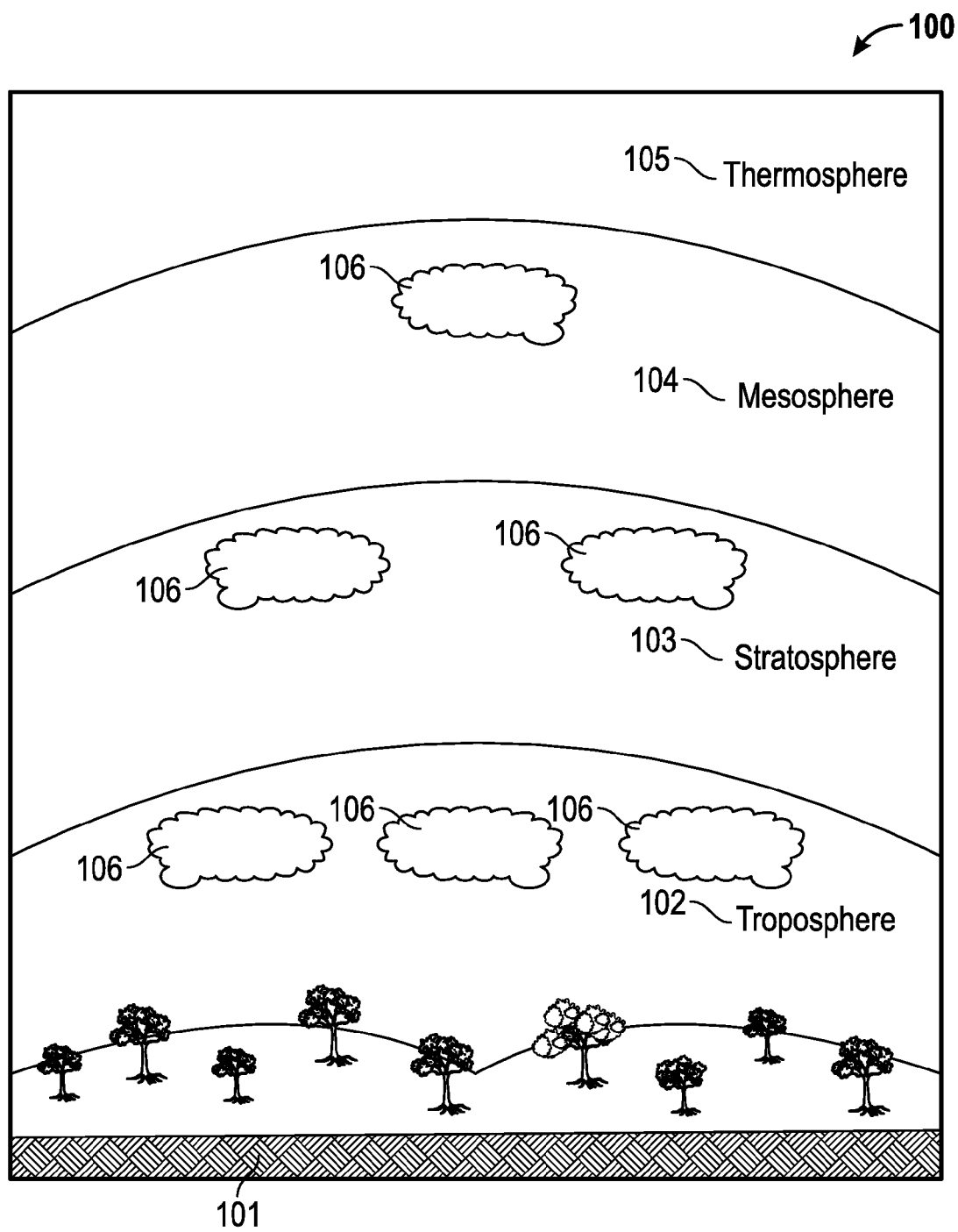
FIG. 1 is a simplified view of Earth's atmosphere.

Referring to FIG. 1, a simplified view of Earth's atmosphere 100 is provided. Beginning above Earth's surface 101, Earth's atmosphere 100 includes troposphere 102, stratosphere 103, mesosphere 104, and thermosphere 105. Troposphere 102 generally extends from Earth's surface 101 to an altitude of approximately 50,000 feet. Stratosphere 103 generally extends from the upper limit of troposphere 102 to an altitude of approximately 170,000 feet. Mesosphere 104 generally extends from the upper limit of stratosphere 103 to an altitude of approximately 270,000 feet. Thermosphere 105 extends beyond the upper limit of mesosphere 104. Many consider thermosphere 105 to be the beginning of space. For example, the International Space Station orbits Earth in thermosphere 105. Generally, clouds 106 are most prevalent in troposphere 102 and stratosphere 103. Clouds 106 are very rare in mesosphere 104. Clouds 106 are not found in thermosphere 105.

Clouds form when the atmosphere contains the proper combination of water vapor and cloud condensation nuclei (CCN). CCN are small particles suspended in the air. When CCN are in air containing water vapor, the water vapor molecules condense on CCN, and cloud droplets form. When water molecules condense on CCN on a mass scale, clouds form. As the water molecules continue to attach to CCN, the cloud droplets reach a critical weight and precipitate out of the atmosphere as rain, snow, sleet, or hail. Cloud formation can be assisted or encouraged by introducing CCN into air already containing water molecules. The artificial introduction of charges into the atmosphere can enhance the formation of CCNs by a process similar to that following natural charge injection (e.g., by cosmic rays). CCN formation from atmospheric ions (e.g., induced by external particles) is discussed in an article by Dr. J. R. Pierce, titled "Cosmic rays and clouds: Potential mechanisms, available at http://www.realelimate.org/index.php/archives/2011/09/cosmic-rays-and-clouds-potential-mechanisms/#ITEM-8796-0. The presence of ions in the atmosphere can enhance the nucleation of small (~1 nm) aerosols. These initial aerosols can then grow by accumulation of trace atmospheric constituents such as sulphuric acid, ammonia, and organic molecules until they are large enough to serve as CCNs. Experimental examination of this process is discussed in "Role of sulphuric acid, ammonia and galactic cosmic rays in atmospheric aerosol nucleation", by Kirkby, et al, Nature 476, 429 (2011). Further, already formed clouds can be precipitated by growing the cloud droplets by introducing additional charges into the cloud.

Figure 2:
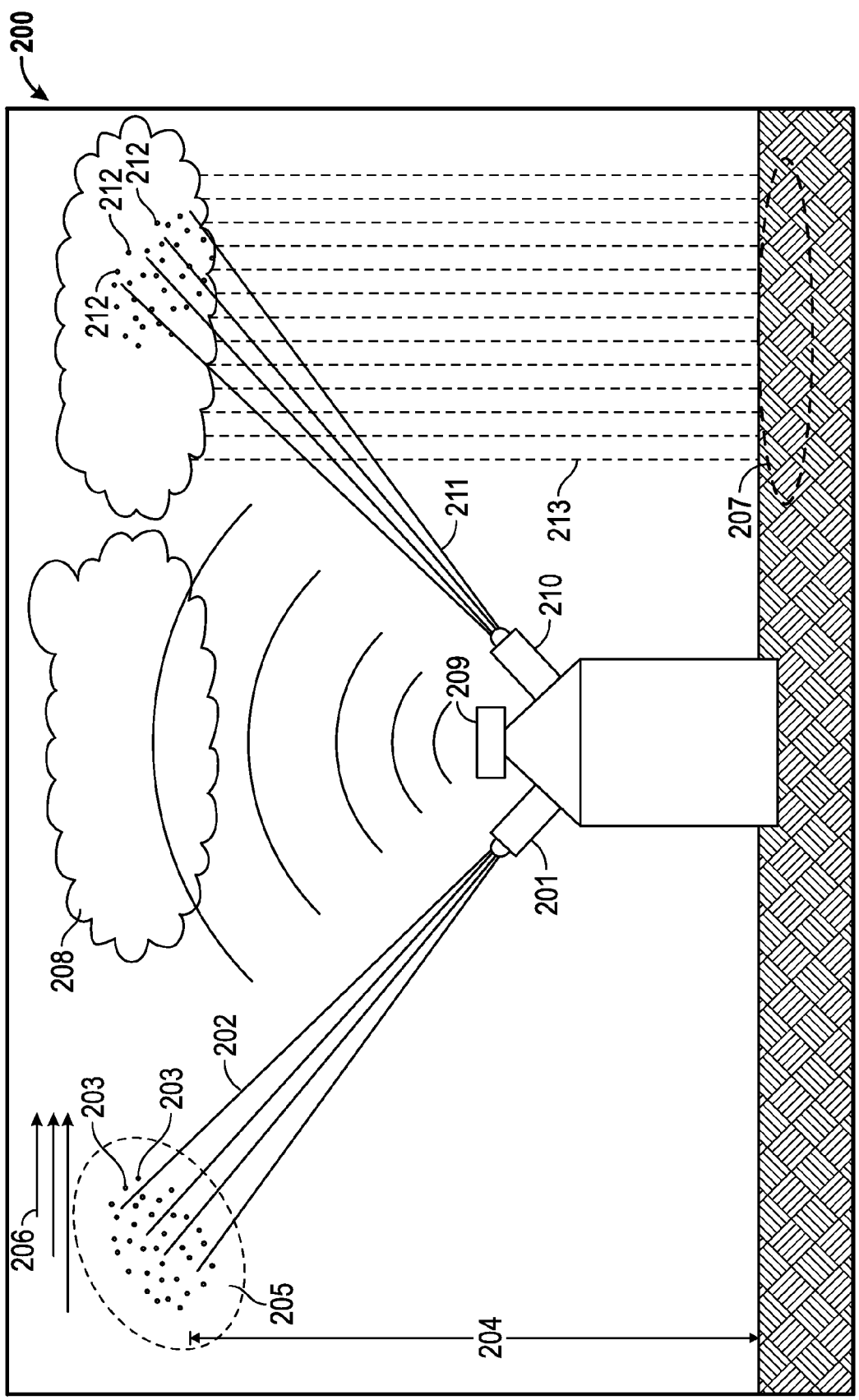
FIG. 2 is a schematic view of an embodiment of a cloud control and precipitation control system.

Referring to FIG. 2, an exemplary system 200 for cloud formation and precipitation is shown. System 200 utilizes energy beam emitter, shown as ion beam emitter 201, to emit an energy beam, shown as ion beam 202, into the atmosphere. Ion beam emitter 201 is a device capable of accelerating ions and forming them into ion beam 202. Ion-beam emitter 201 may use an electric field based accelerator or a laser wakefield accelerator. The ions in ion beam 202 may be protons or ions with heavier nuclei. The ions are positively or negatively charged. Ion beam emitter 201 emits ion beam 202 such that electrons are stripped from atmospheric molecules that encounter ion beam 202. Accordingly, ion beam 202 is operable to create charged particles 203 in the atmosphere by depositing energy into the atmosphere that charges particles already existing in the atmosphere. Alternatively, system 200 utilizes a particle beam emitter. A particle beam emitter operates to create a charged particle within the emitter and eject the charged particle out along the path of a particle beam. The particle beam may be an electron or positron beam. The particle beam may comprise neutral particles formed by adding or removing electrons from charged particles leaving the emitter. The particle beam emitter may be an ion accelerator as discussed above, a cathode ray tube, a photocathode, or an electron gun. The particles within the particle beam strip electrons from atmospheric molecules when the particle beam deposits the particles within the atmosphere. In yet another alternative, system 200 utilizes a laser emitter and laser beam to ionize particles within the atmosphere.

Regardless of the specific beam emitter utilized, system 200 is operable to form charged particles 203 within the atmosphere. When charged particles 203 are formed across an area of the atmosphere, multiple charge centers form. Charged particles 203 are positively or negatively charged.

Ion beam emitter 201 may be mounted on a fixed structure. For example, as shown in FIG. 2, ion beam emitter 201 is mounted on the roof of a building. Alternatively, ion beam emitter 201 is mounted on a vehicle such that it is repositionable.

Ion beam emitter 201 is both energy adjustable and aimable such that ion beam 202 targets a specific zone in the atmosphere containing water vapor 205. The energy of ion beam emitter 201 is adjustable such that charged particles 203 are formed at a target altitude 204. Because higher energy ions generally have a greater range than low energy ones, a higher energy beam is capable of creating charged particles at longer distances than a lower power beam. Accordingly, during high energy operation, a ground-based ion beam emitter is capable of charging particles at high altitudes. Ion beam emitter 201 is capable of charging particles in troposphere 102, stratosphere 103, and as high as mesosphere 104. In the alternative embodiment utilizing a particle beam emitter or a laser, altitude is controlled by adjusting both the energy of the particle beam or laser (e.g., the frequency of the light) as well as the size and stopping power of the particles within a particle beam. In one embodiment, it is contemplated that the ion beam comprises protons of approximately one gigaelectronvolt of energy and have a stopping power of approximately 300 gm/cm$^2$. Ion beam emitter 201 is aimable such that ion beam 202 is operable to target and "paint" the zone in the atmosphere containing water vapor 205. Ion beam emitter 201 further performs a sweeping function such that ion beam 202 is operable to form charged particles 203 across the atmospheric zone containing water vapor 205. The sweeping function creates charge centers in the zone in the atmosphere containing water vapor 205.

System 200 is capable of placing charged particles based on predictions of wind 206 direction and speed. Predictions of wind 206 direction and speed are performed internally by system 200. Alternatively, system 200 receives wind and weather data from an outside source. System 200 analyzes wind 206 and forms charged particles 203 upwind of target land area 207 such that cloud 208 forms and passes over target land area 207. The distance upwind may be many miles away from target land area 207 depending on atmospheric conditions. Accordingly, ion beam emitter 201 may need to be placed at a distance upwind from target land area 207. For example, a farmer operating an ion beam emitter (e.g., ion beam emitter 201) may need to place the emitter on another's land. In this case, it is contemplated that the farmer may pay the land owner a rental fee for placing the ion beam emitter on the land.

Charged particles 203 enhance production of CCNs. Accordingly, charged particles 203 increase condensation of water vapor 205 in the atmosphere into cloud droplets. After enough cloud droplets form, cloud 208 forms. Cloud 208 travels with wind 206. Ion beam emitter 201 tracks cloud 208 as it travels across the sky such that ion beam emitter continues to deposit energy and create more charged particles 203 in the atmosphere until a desired amount of charged particles 203 are deposited. The amount of charged particles 203 deposited is controlled by a user input. The user input varies depending upon various factors, including, but not limited to water vapor amount, altitude, temperature, desired cloud size, wind speed, and atmospheric pressure. Alternatively, system 200 utilizes sensor 209 to monitor cloud 208 formation. System 200 is configured such that when sensor 209 determines cloud 208 reaches a user selected quantity or quality, system 200 automatically shuts down ion beam emitter 201. The user selected quality or quantity is a desired cloud 208 size, density, opacity, or any combination thereof.

Figure 3:
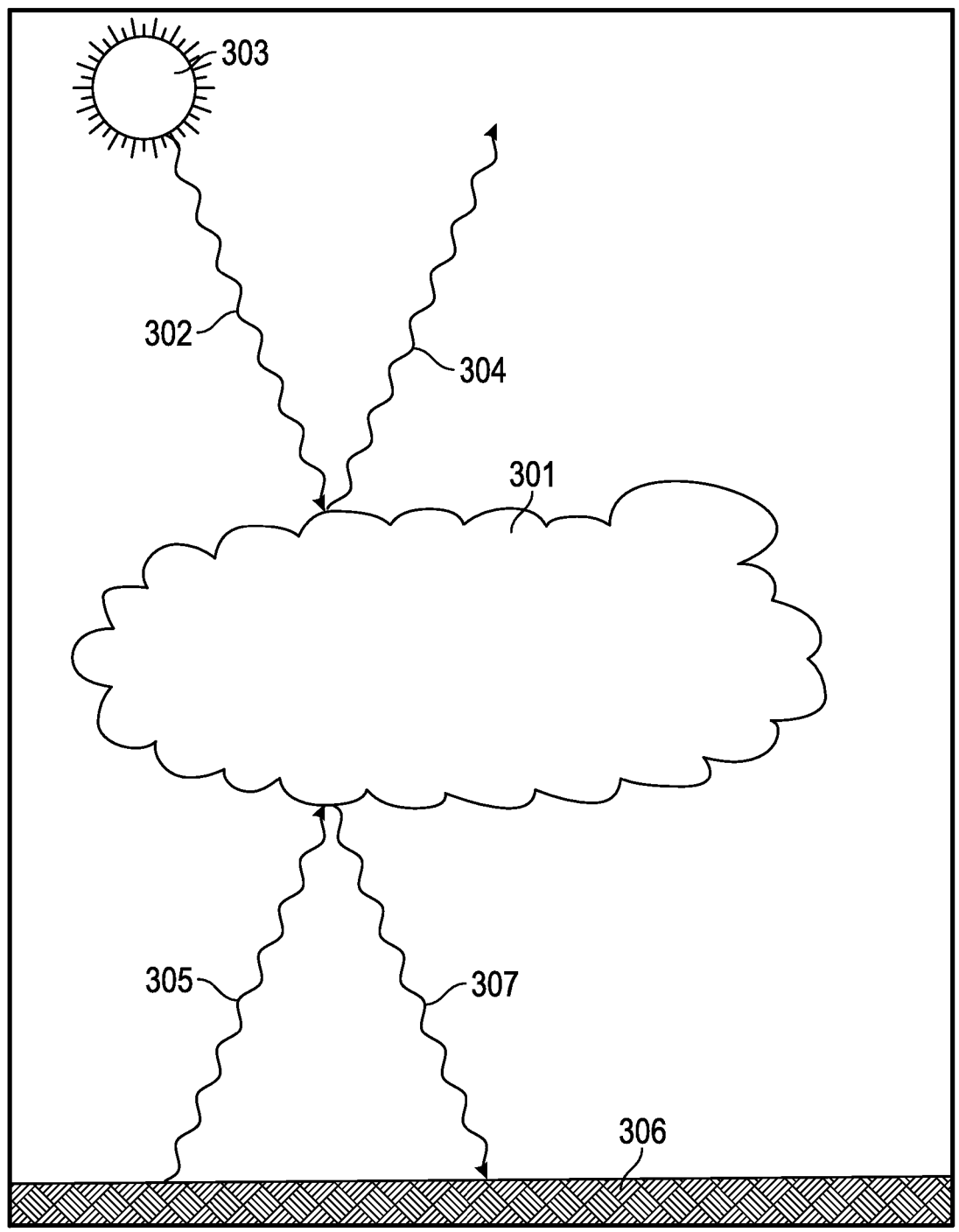
FIG. 3 is a schematic view of cloud radiation reflection.

In some cases, system 200 is designed to create cloud 208 such that cloud 208 merely passes over target land area 207 without precipitating. Accordingly, cloud 208 is propelled through the atmosphere by wind 206 such that cloud 208 traverses target land area 207. Placing cloud 208 over target land area 207 affects the local climate surrounding target land area 207. System 200 is operable to create cloud 208 with a designated albedo factor in order to control the climate surrounding target land area 207. For example, depending on the characteristics and altitude of a cloud, a cloud can control radiation transport by increasing or decreasing the albedo factor for reflection or absorption of shortwave and/or longwave energy bands. Thus, as shown in FIG. 3, a cloud 301 is positioned to increase the albedo factor and reflect incoming radiation 302 from sun 303 back out of the atmosphere (reflected radiation 304) for a cooling effect. Alternatively, cloud 301 is positioned to reflect outgoing thermal radiation 305 from Earth's surface 306 back to the surface 306 (reflected radiation 307). In this case, cloud 301 functions similar to a blanket and prevents thermal energy from escaping through the atmosphere. Depending on the size of cloud 301, the placement of cloud 301, and other weather conditions, including other clouds formed naturally or through system 200, it is possible to control climate on a local scale, on a mesoscale, or on a global scale.

Referring back to FIG. 2, in other instances, system 200 is operable to precipitate cloud 208 while over target land area 207. For example, a farmer may wish to encourage rainfall over farmland to reduce water usage through irrigation. System 200 utilizes a second ion beam emitter 210 to emit a second ion beam 211 into cloud 208. Alternatively, ion beam emitter 210 targets a naturally created cloud. Similar to ion beam emitter 201, ion beam emitter alternatively is a particle beam emitter or a laser emitter. Second ion beam 211 is operable to deposit additional charged particles 212 into cloud 208. Additional charged particles 212 carry a positive or negative charge. Additional charged particles 212 encourage already condensed water droplets making up the cloud to grow in size until the droplets precipitate out as rain, snow, sleet, or hail 213. In an alternate embodiment, system 200 precipitates cloud 208 with ion beam emitter 201. In yet another embodiment, system 200 utilizes weather prediction models to assist in forming cloud 208 such that cloud 208 will naturally precipitate over target land area 207 without the need for an additional charged particle deposit. Depending on the size of cloud 208, the placement of cloud 208, and other weather conditions, including other clouds formed naturally or through system 200, it is possible to control precipitation on a local scale, on a mesoscale, or on a global scale.

Figure 4:
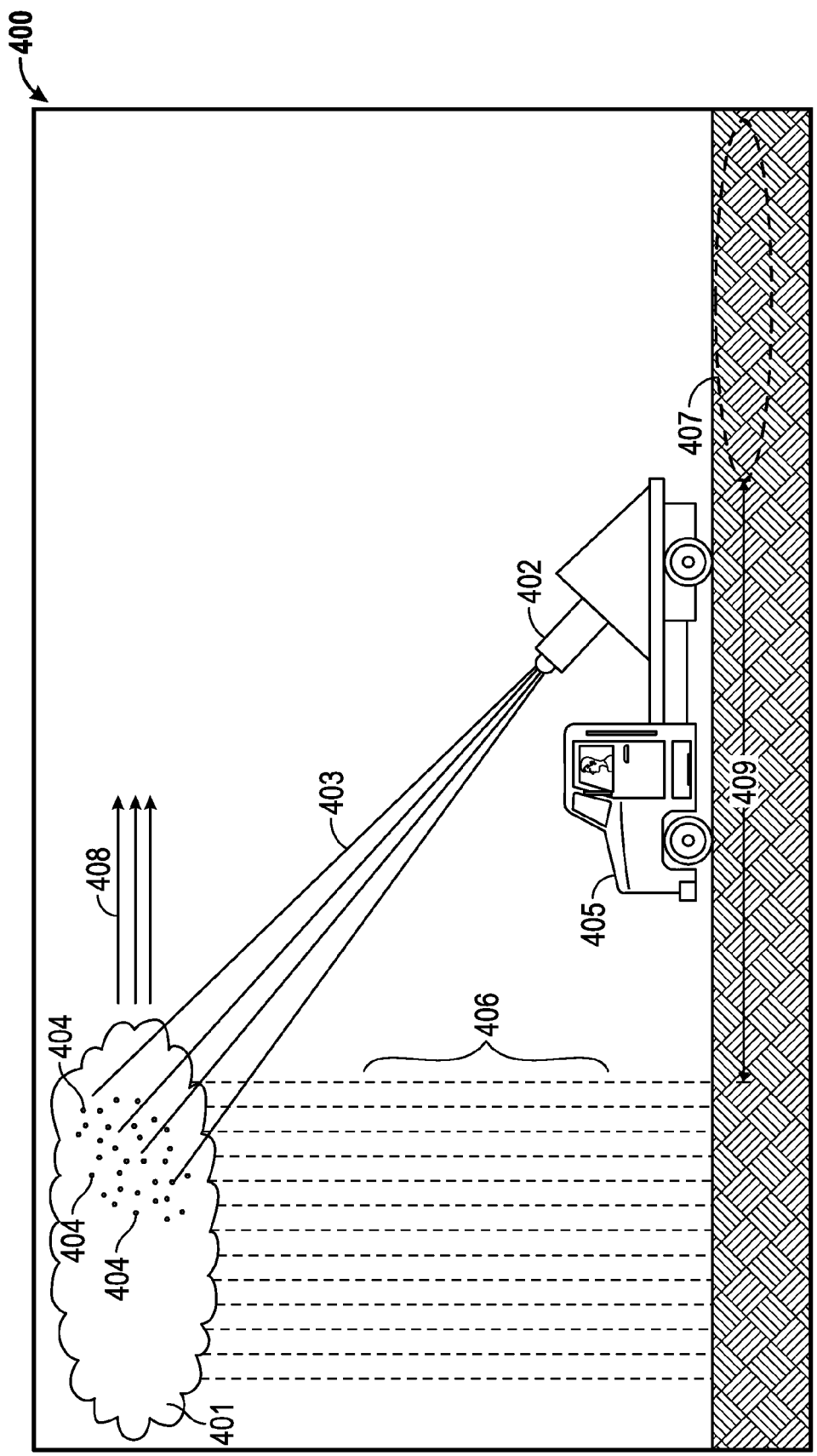
FIG. 4 is a schematic view of another embodiment of a cloud control and precipitation control system.

Referring to FIG. 4, an exemplary system 400 for precipitation control is shown. System 400 is operable to precipitate cloud 401. System 400 utilizes ion beam emitter 402 to emit ion beam 403 such that charged particles 404 are deposited in cloud 401. Alternatively, system 400 utilizes a particle beam emitter or a laser emitter. Ion beam emitter 402 is mounted on vehicle 405 such that the vehicle locates and follows cloud 401. Alternatively, ion beam emitter is mounted on a fixed structure. Ion beam emitter 402 is power adjustable such that ion beam 403 deposits charged particles 404 at a designated altitude. Further, ion beam emitter 402 is aimable such that ion beam 403 paints cloud 401 with charged particles 404. Charged particles 404 encourage already condensed water droplets making up cloud 401 to grow in size. Once the cloud droplets reach a critical weight, the water precipitates out of cloud 401 as rain, snow, sleet, or hail 406.

Under certain circumstances, it is desirable to keep target land area 407 free of precipitation. For example, target land area may house an outdoor event such as a sporting event, a wedding, or a concert. Participants in the event and spectators of the event generally do not want precipitation affecting the event experience. Accordingly, system 400 is employed upwind of an event. Cloud 401 is propelled across the sky by wind 408. System is operable to calculate distance 409 from target land area 407. Distance 409 is a factor of wind speed, cloud 401 size, and atmospheric conditions. System 400 precipitates cloud 401 at distance 409 such that cloud 401 is precipitated out before wind 408 carries cloud 401 over target land area 407. Thus, target land area 407 does not experience precipitation from cloud 401. It should also be understood that system 400 may alternatively be employed to precipitate cloud 401 over target land area 407.

Figure 5:
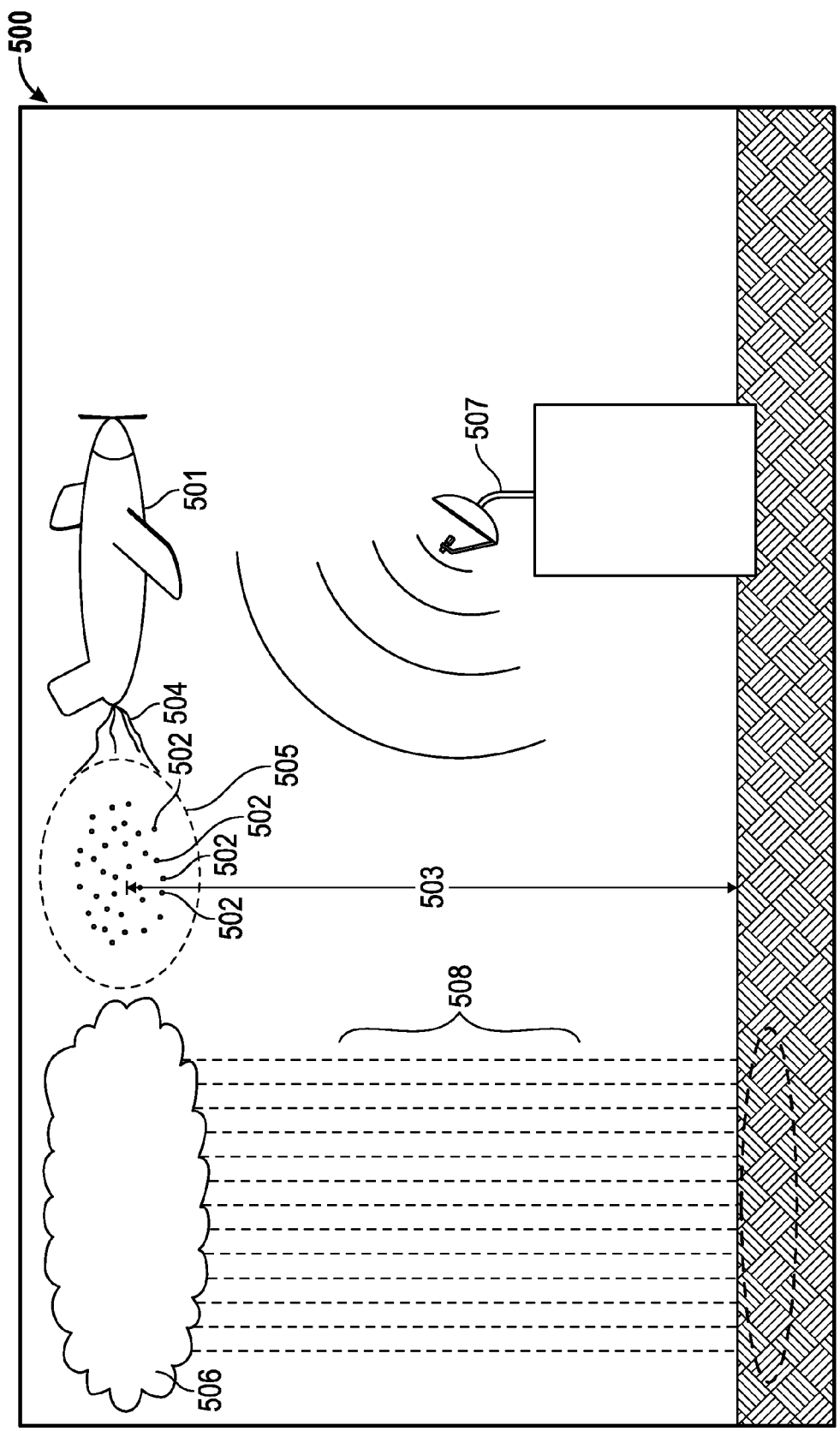
FIG. 5 is a schematic view of yet another embodiment of a cloud control and precipitation control system.

Referring to FIG. 5, an exemplary system 500 for cloud formation and precipitation is shown. System 500 utilizes air based apparatus, shown as airplane 501, for delivering charged particles 502 into the atmosphere. Airplane 501 is manned in an exemplary embodiment. Alternatively, airplane 501 is remotely controlled. Airplane 501 is operable to place charged particles 502 at a precise altitude 503. Further, airplane 501 is operable to deposit charged particles 502 over wide areas by flying different patterns over the ground. Charged particles 502 are deposited using a field electron emission technique. The field electron emission technique is cold field emission or any other electron emission technique operable to deposit charged particles 502 in the atmosphere. During field electron emission, plane 501 drags trailing wires 504 (which may comprise single wires, arrays or wires, charge sheets, etc.) through the atmosphere. Trailing wires 504 create an electric field such that air molecules emit electrons (e.g., by direct or avalanche ionization) creating charged particles 502. Alternatively, plane 501 utilizes fiber optic lines for photoionization or photoemission, such that electrons are formed in the air. In yet another embodiment, plane 501 carries a beam emitter capable of forming charged particles 502 in the atmosphere. The beam emitter is an ion beam emitter, a particle beam emitter, or a laser beam emitter. In a further embodiment, system 500 utilizes cascading charge injection on the order of 30 electronvolts per charge pair. Alternatively, system 500 uses weakly-cascading charge injection or non-cascading means of charge injection.

Plane 501 targets a zone of water vapor 505 in the atmosphere. Plane 501 drags trailing wires through water vapor 505 and deposits charged particles 502 within the water vapor 505 to create charge centers in the atmosphere. Charged particles 502 within water vapor 505 act as CCN enhancers. Accordingly, charged particles 502 enhance condensation of water vapor 505 into cloud droplets. After enough cloud droplets form, cloud 506 forms. Plane 501 continues to deposit charged particles 502 into water vapor 505 and cloud 506 until cloud 506 reaches the desired size and density.

The flying pattern of plane 501 and the amount of charge running through trailing wires 504 are modified to achieve a desired density of cloud 506 and a desired size of cloud 506 based on various atmospheric conditions including, but not limited to water vapor amount, altitude, temperature, desired cloud size, wind speed, and atmospheric pressure.

Alternatively, system 500 utilizes sensor 507 to monitor cloud 506 formation. Sensor 507 is ground based. Sensor 507 is a radar sensor or any other type of sensor operable to measure cloud 506 status. The measured cloud status is any of a cloud size, a cloud density, a cloud albedo factor, a temperature, a CCN concentration, presence of trace atmospheric constituents, or the presence of precipitation coming from cloud 506. Sensor 507 communicates with plane 501 through a radio link. Alternatively, sensor 507 is mounted on plane 501.

Additionally, system 500 is operable to precipitate cloud 506. In order to facilitate cloud 506 precipitation, plane 501 deposits charged particles 502 within cloud 506. When placed inside cloud 506, charged particles 502 encourage already condensed water droplets making up cloud 506 to grow in size until the droplets precipitate out as rain, snow, sleet, or hail 508.

It should be understood that system 500 is not limited to use through plane 501. System 500 is operable with many types of airships or flying devices including, but not limited to, weather balloons, airships, blimps, and unmanned air drones. Further, it is contemplated that use of tethered balloons or airships are used to consistently deposit charged particles 502 in a particular location. Such a setup facilitates a continuous charge-center the atmosphere, and thus continuous cloud formation.

Figure 6:
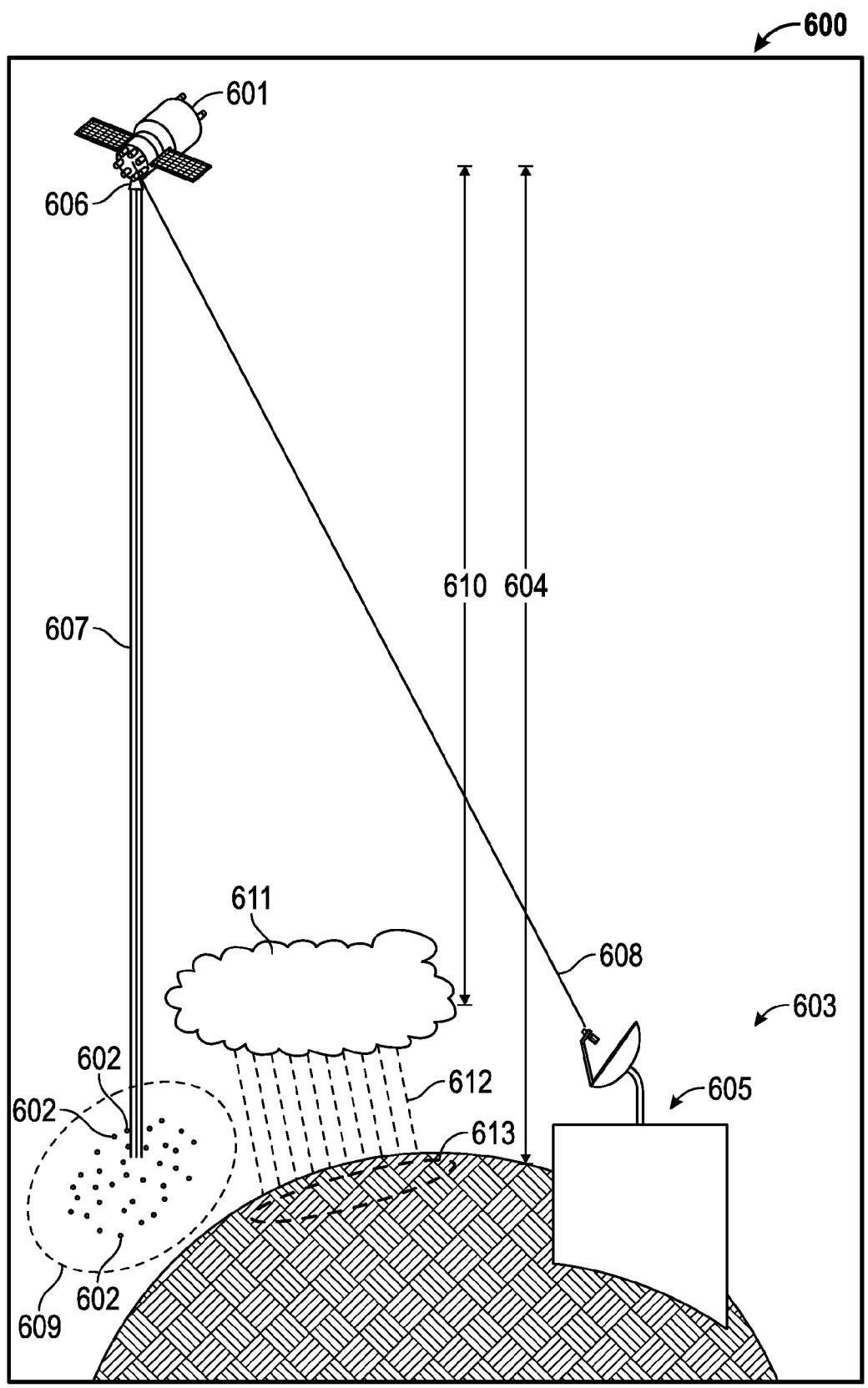
FIG. 6 is a schematic view of a further embodiment of a cloud control and precipitation control system.

Referring to FIG. 6, an exemplary system 600 for cloud formation and precipitation is shown. System 600 utilizes a satellite 601 to deposit charged particles 602 into Earth's atmosphere 603. Satellite is positioned at orbit distance 604 and communicates with base station 605. Orbit distance 604 is low Earth orbit. Alternatively, orbit distance 604 is a medium Earth orbit or a geostationary orbit. Satellite 601 utilizes ion beam emitter 606 to emit ion beam 607 into the atmosphere. Ion beam 607 is operable to charge particles 602 in the atmosphere. Alternatively, the system 600 utilizes a particle beam emitter. In yet another alternative, system 600 utilizes a laser emitter and laser beam to charge particles within the atmosphere. Regardless of the specific beam emitter utilized, system 600 is operable to introduce charged particles 602 into the atmosphere. Charged particles 602 are positively or negatively charged.

Satellite 601 receives instructions from base station 605 through wireless (e.g., RF or optical) link 608. The instructions include the location of a target zone of water vapor 609 in the atmosphere 603. The instructions may be based off of data received at base station 605 from ground, air, or space based sensors. Alternatively, base station 605 sends instructions to satellite 601 based on a user input. Zone of water vapor 609 is at distance 610 from satellite 601. Ion beam emitter 606 is both energy adjustable and aimable such that ion beam 607 is directed to deposit charged particles 602 into the target zone of water vapor 609. The energy of ion beam emitter 606 is adjustable such that charged particles 602 are deposited at target distance 610. A higher energy beam is capable of creating charged particles closer to Earth's surface than a lower energy beam. In the alternative embodiment utilizing a particle beam emitter or a laser, distance 610 is controlled by adjusting both the energy of the particle beam or laser as well as the size and stopping power of the particles within a particle beam. In one embodiment, it is contemplated that the ion beam 607 comprises protons of approximately 1 gigaelectronvolt of energy and have a stopping power of approximately 300 gm/cm$^2$. Ion beam emitter 606 is aimable such that ion beam 607 is operable to paint the zone of water vapor 609 with charged particles 602.

Charged particles 602 act as CCN enhancers. Accordingly, charged particles 602 increase condensation of water vapor in the atmosphere to form cloud 611. The amount of charged particles 602 formed is controlled by base station 605. Accordingly, base station 605 instructs satellite 601 to form the cloud 611 to a desired cloud size, density, opacity, or any combination thereof.

Further, system 600 is operable to precipitate clouds in a similar fashion to system 400 and system 200. System 600 utilizes ion beam emitter 606 to emit ion beam 607 such that charged particles 602 are deposited in an already existing cloud or a recently formed cloud 611. Charged particles 602 encourage already condensed water droplets making up cloud 611 to grow in size. Once the cloud droplets reach a critical weight, the water precipitates out of cloud 401 as rain, snow, sleet, or hail 612. It is contemplated that base station 605 instructs satellite 601 to precipitate cloud 611 over a target area of land 613.

In order to properly perform a cloud formation step, any of the above systems 200, 400, 500, or 600 utilize water vapor (205, 505, and 609) in the atmosphere. As noted earlier, cloud formation requires both CCN and water vapor. Depositing CCN into a dry atmosphere will not efficiently create clouds. Artificial cloud formation requires locating atmospheric regions that are both supersaturated with water vapor and lack sufficient natural CCN to form clouds. Accordingly, systems 200, 400, 500, or 600 are operable to locate atmospheric regions containing adequate moisture. The location information is received from third-party weather analysis services. Alternatively, systems 200, 400, 500, or 600 employ sensors to locate atmospheric regions supersaturated with water vapor and lacking in natural CCN. The sensors output humidity and location data such that zones of uncondensed water vapor are located in the atmosphere. The sensors may also measure temperature, degree of saturation, existing CCN quantity, existing CCN type, existing CCN size, existing CCN charge, air velocity, atmospheric pressure, and any other helpful atmospheric condition. The sensors may be ground based or satellite based. Still further, sensors may be mounted to flying vehicles such as weather balloons, drones, or airplanes. Output from the sensors may be input into atmospheric models to determine suitability for cloud formation or cloud precipitation. The models may be analytical or computational. The models assist systems 200, 400, 500, and 600 in determining placement of charge centers, evolution of charge centers into CCN, duration of CCN existence before turning into aerosols, time estimates for cloud formation, estimates of radiation scattering by formed clouds, and time and precipitation estimates for formed clouds. Performing an analysis to target atmospheric regions containing appropriate levels of water vapor increases the effectiveness of systems 200, 400, 500, or 600 during both cloud formation and cloud precipitation. Further, such an analysis enables systems 200, 400, 500, or 600 to avoid forming CCN in places where inadequate moisture exists.

Use of any of the above systems 200, 400, 500, or 600 may be facilitated through a controller. The controller includes a processing circuit having a processor and memory. The controller receives input from any of the above mentioned sensors as well as weather prediction services and atmospheric models. The controller is operable to perform all calculations and functions including, but not limited to, determining target distances and altitudes, aiming and positioning charge emitting devices to control the location of charge centers, and controlling the amount of charged particles deposited at the target location.

Figure 7:
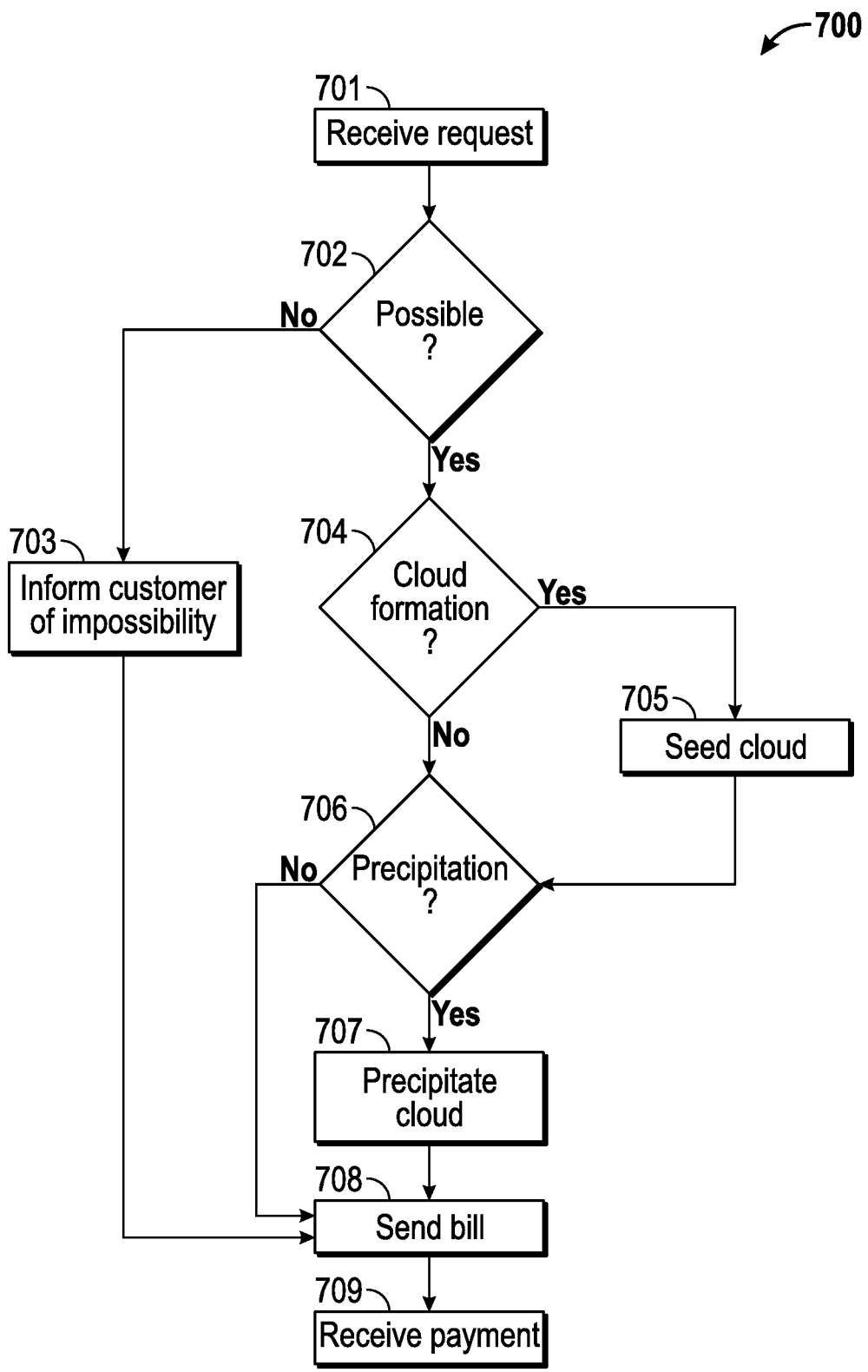
FIG. 7 is a flow diagram for a weather and climate control business.

Any of the above systems, systems 200, 400, 500, or 600, can be operated as part of a business. Referring to FIG. 7, a flow chart for the operation of a weather and climate control business is shown as method 700. Method 700 is operable to receive a customer request (step 701). The customer request includes the desired weather or climate control services. After receiving the customer request (step 701), method 700 analyzes the customer request to determine whether the request is physically possible (step 702). Weather and climate control via cloud formation and cloud precipitation is only available under the proper set of atmospheric circumstances. For example, the atmosphere needs to contain the proper amount of water vapor to seed a cloud with injected CCN. Additionally, the atmospheric zones of water vapor need to be located in an appropriate position in relation to wind and weather patterns. Accordingly, method 700 analyzes data from sensors, meteorologist services, analytical and computational models, and physical measurements made from the ground, airplanes, or satellites to make a determination on the feasibility of satisfying the customer request. If the customer request is not possible, method 700 informs the customer of the impossibility (step 703) and skips to billing the customer (step 708). It is contemplated that method 700 includes 708 for an impossible request because step 702 requires the expenditure of analysis resources to determine the possibility of the customer request. If the customer request is possible, method 700 moves on to the next determination.

Method 700 determines whether the customer request includes cloud formation (step 704). If the customer request includes cloud formation, then method 700 utilizes any of the above systems (200, 400, 500, or 600) to seed a cloud (step 705) in an area that the customer designates. The cloud formation (step 704) is for the purpose of climate control, in which case the clouds formed will not be precipitated. Alternatively, the cloud formation (step 704) is the first step in a two-part precipitation request by the customer.

Method 700 includes determining whether the customer request includes a precipitation request (step 706). If the request includes a precipitation request, method 700 precipitates a cloud out of the atmosphere (step 707). The precipitation request includes a target area of land to be precipitated on or to be kept dry. If the land is to be precipitated on, method 700 employs any of the above systems (200, 400, 500, or 600) to precipitate an already existing cloud over the designated area of land. The cloud to be precipitated is formed during step 705. Alternatively, the cloud is a naturally existing cloud already in the atmosphere. If the target area of land is to be kept dry, the customer will designate a time window in which the target land is to be kept dry. Method 700 precipitates clouds in route to the target area of land before the clouds arrive at the target land area over the designated period of time. To accomplish this, method 700 includes analysis of weather and wind patterns to locate clouds that are likely to naturally precipitate on the land for the customer designated period of time. If any clouds are located, method 700 utilizes any of methods 200, 400, 500, or 600 to precipitate the cloud out of the atmosphere prior to the cloud's arrival at the target area of land.

Referring still to FIG. 7, the customer is billed for the provided services (step 708). It is contemplated that the customer is billed before any services are performed. Further, it is contemplated that method is performed for a long duration of time, such as a year or over the course of a farming season. In this case, it is desirable for a business utilizing method 700 bill its customers on a regular billing cycle as services are performed. The billing cycle may be weekly, monthly, quarterly, or annually. After sending the customer a bill (step 708), method 700 includes receiving payment from the customer (step 709).

Referring to FIG. 8, method 800 of cloud formation and precipitation is shown. The above systems and methods (200, 400, 500, 600, and 700) utilize a form of method 800. Method 800 locates a target atmospheric region (step 801). The atmospheric region is an area supersaturated with water vapor and lacking natural CCN if the user of the method desires to form a cloud. Alternatively, the atmospheric region is an area containing a cloud if the user desires to precipitate a cloud. Method 800 targets the atmospheric region located in step 801 with a device configured to deposit CCN into the atmospheric region (step 802). Method 800 deposits charged particles in the atmospheric region (step 803). The deposited charged particles act as CCN. Method 800 utilizes an ion beam emitter, a particle beam emitter, a laser beam emitter, or field electron emission to deposit the charged particles in the target atmospheric region. Method 800 senses a cloud status (step 804). Method 800 uses a sensor to determine the cloud status. The cloud status may be a cloud density, a cloud size, a cloud albedo factor, a presence of trace atmospheric constituents or the presence of precipitation. After the cloud being formed or precipitated reaches a desired cloud status, method 800 stops depositing charged particles (step 805).

The above systems and methods (200, 400, 500, 600, 700, and 800) are contemplated for employment in many situations. For example, a winter resort may employ any of the above systems and methods to facilitate snowfall. Doing so ensures optimized skiing, snowboarding, and other winter activity conditions. The resort may own the equipment, rent the equipment from an equipment provider, or contract a business to facilitate the snowfall. The resort can recoup the added costs of facilitating the snowfall by charging visitors of the resort a surcharge or convenience fee for guaranteed snow. In another exemplary use, an insurance company may employ any of the above systems and methods to facilitate precipitation. The insurance company may provide crop insurance to farmers. In this case, the insurance company may employ the above systems and methods to facilitate rainfall to reduce the risk of or damage caused by a drought. Alternatively, the insurance company may insure property owners against weather damage (e.g., hail damage). Accordingly, the insurance company may detect an incoming weather system with the potential to cause damage to the insured property and facilitate precipitation of the weather system upwind of the insured property. In either case, the insurance company may own the equipment, rent the equipment from an equipment provider, or contract a business to facilitate the precipitation.

The above systems and methods (200, 400, 500, 600, and 800) are also contemplated to be employed by a rental business. The rental business owns the beam emitter and sensing equipment required for systems and methods 200, 400, 500, 600, and 800. Customers rent the equipment for a period of time. The rental may be for a single use (e.g., a single day or to facilitate cloud formation or precipitation for a designated time period), a growing or farming season, or a longer term rental or lease. The rental business may also offer tangential services to the renting of the equipment. For example, the rental business may provide training classes on how to properly use the equipment or provide weather condition detection services. Alternatively, a rental of the equipment may include a dedicated operator of the equipment such that the renter need not be trained on use of the equipment.

The above systems and methods (200, 400, 500, 600, and 800) are further contemplated to be employed by government agencies. Systems and methods 200, 400, 500, 600, and 800 have general public welfare uses. For example, a government agency may employ any of the above systems to facilitate precipitation to end droughts or wildfires. Further, a government agency may employ any of the above systems to moderate the temperature of locations during times of extreme heat or cold. Additionally, systems and methods 200, 400, 500, 600, and 800 have defense and military applications. For example, a government agency may employ any of the above systems to create constant cloud coverage over a designated area of land. Such cloud coverage is operable to block satellite and spy-plane aerial surveillance. A government agency may employ any of the above systems to advantageously control precipitation and climate.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the enclosure may be constructed from any of a wide variety of materials that provide sufficient strength or durability, in any of a wide variety of colors, textures, and combinations. Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word "exemplary" is intended to present concepts in a concrete manner. Accordingly, all such modifications are intended to be included within the scope of the present inventions. The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes, and omissions may be made in the design, operating conditions, and arrangement of the preferred and other exemplary embodiments without departing from scope of the present disclosure or from the spirit of the appended claims.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed:

1. A system for facilitating cloud formation and cloud precipitation comprising:
    a beam emitter configured to emit a beam to form charged particles within an atmospheric zone containing water vapor, wherein the charged particles enhance formation of cloud condensation nuclei, and wherein water vapor condenses on the cloud condensation nuclei forming cloud droplets; and
    a sensor configured to detect a cloud status and output a signal corresponding to the cloud status, wherein the cloud status includes at least one of a cloud density, a cloud size, and a cloud albedo factor; and
    a controller configured to receive the signal and control operation of the beam emitter based on the signal.

2. The system of claim 1 wherein the beam emitter is an ion beam emitter and the beam is an ion beam.

3. The system of claim 2 wherein the ion beam is configured to charge particles already existing in the atmospheric zone.

4. The system of claim 1 wherein the beam emitter is a laser beam emitter and the beam is a laser beam.

5. The system of claim 1 wherein the beam emitter is a particle beam emitter and the beam is a particle beam.

6. The system of claim 1 wherein the beam emitter is configured to emit particles having a stopping power of approximately 300 gm/cm$^2$.

7. The system of claim 1 wherein the beam emitter is energy adjustable such that the beam is configured to form charged particles at different distances from the beam emitter.

8. The system of claim 1 wherein the beam emitter is flux adjustable such that the beam is configured to form different amounts of charged particles within the atmospheric zone.

9. The system of claim 1 wherein the beam emitter is aimable such that the beam is configured to deposit charged particles at different locations across the atmospheric zone.

10. The system of claim 1 wherein the controller is configured to operate the beam emitter in order to adjust at least one of an energy, a flux, and a direction of the beam.

11. The system of claim 1 wherein the cloud status is a cloud density.

12. The system of claim 1 wherein the cloud status is a cloud albedo factor.

13. The system of claim 1, wherein the cloud status is a presence of cloud condensation nuclei.

14. The system of claim 1, wherein the cloud status is a cloud temperature.

15. The system of claim 1, wherein the cloud status is a presence of trace atmospheric constituents.

16. The system of claim 1 further comprising a water vapor sensor configured to detect a location of the atmospheric zone containing water vapor and configured to output a signal corresponding to the location of the atmospheric zone to the controller.

17. The system of claim 1 further comprising a wind sensor configured to detect a wind direction and a wind speed and output a signal corresponding to the wind direction and the wind speed to the controller.

18. The system of claim 1 including a second beam emitter configured to emit a second beam.

19. The system of claim 1 wherein the beam emitter is configured to form charged particles within a cloud formed by the cloud droplets such that the cloud droplets within the cloud expand in size and precipitate out of the cloud.

20. The system of claim 1 wherein the beam emitter is mounted on a flying device.

21. An air-based system for facilitating cloud formation and cloud precipitation comprising:
  a flying device;
  a charging device configured to form charged particles in an atmosphere containing water vapor, wherein the charged particles enhance formation of cloud condensation nuclei, and wherein the water vapor condenses on the cloud condensation nuclei forming cloud droplets; and
  a sensor configured to detect a cloud status and output a signal corresponding to the cloud status, wherein the cloud status includes at least one of a cloud density, a cloud size, and a cloud albedo factor;
  wherein the charging device is responsive to the signal corresponding to the cloud status.

22. The system of claim 21 wherein the charging device creates charged particles through field electron emission.

23. The system of claim 22 wherein the field electron emission is cold field electron emission.

24. The system of claim 21 wherein the charging device employs cascading charge injection.

25. The system of claim 24 wherein the cascading charge injection utilizes approximately thirty electronvolts per charge pair.

26. The system of claim 21 wherein the sensor communicates with the flying device through a wireless link.

27. The system of claim 21 wherein the cloud status is a cloud density.

28. The system of claim 21 wherein the cloud status is a cloud albedo factor.

29. The system of claim 21 wherein the sensor is a radar sensor.

30. The system of claim 21, wherein the cloud status is a presence of cloud condensation nuclei.

31. The system of claim 21, wherein the cloud status is a cloud temperature.

32. The system of claim 21, wherein the cloud status is a presence of trace atmospheric constituents.

33. The system of claim 21 further comprising a water vapor sensor configured to detect a zone of water vapor in the atmosphere and configured to output a signal corresponding to a location of the zone of water vapor to the flying device.

34. The system of claim 33 wherein the flying device is configured to deposit charged particles in the zone of water vapor.

35. The system of claim 21 further comprising a wind sensor configured to detect a wind direction and a wind speed and output a signal corresponding to the wind direction and the wind speed to the flying device.

36. The system of claim 35 wherein the flying device is configured deposit charged particles such that a cloud is formed in an upwind direction of a target area of land.

37. The system of claim 21, wherein the charging device is configured to vary a charge formation in response to the cloud status.

38. A method of facilitating cloud precipitation comprising:
  targeting a cloud comprising cloud droplets;
  providing a charge forming device;
  sensing a cloud status, wherein the cloud status includes at least one of a cloud density, a cloud size, and a cloud albedo factor; and
  forming charged particles within the cloud via the charge forming device based on the sensed cloud status, wherein the charged particles facilitate an expansion in size of the cloud droplets.

39. The method of claim 38, wherein targeting of the cloud is responsive to the cloud status.

40. The method of claim 38 wherein forming charged particles comprises charging existing particles that already exist within the cloud with the charge forming device.

41. The method of claim 40 wherein the charge forming device is an energy beam configured to deposit energy within the cloud, wherein the energy ionizes existing particles.

42. The method of claim 41, wherein the energy beam is an ion beam.

43. The method of claim 41, wherein the energy beam is a laser beam.

44. The method of claim 41, wherein the energy beam is a particle beam.

* * * * *